(12) United States Patent
Reid et al.

(10) Patent No.: US 11,946,688 B2
(45) Date of Patent: Apr. 2, 2024

(54) PORTABLE PLATFORM BASED PRODUCT STORAGE AND EXPANSION SYSTEMS, DEVICES AND METHOD

(71) Applicant: FFF Enterprises, Inc., Temecula, CA (US)

(72) Inventors: Kenneth Shay Reid, Temecula, CA (US); Connor Ramm, Temecula, CA (US)

(73) Assignee: FFF Enterprises, Inc., Temecula, CA (US)

( * ) Notice: Subject to any disclaimer, the term of this patent is extended or adjusted under 35 U.S.C. 154(b) by 0 days.

(21) Appl. No.: 17/752,373

(22) Filed: May 24, 2022

(65) Prior Publication Data

US 2023/0384024 A1 Nov. 30, 2023

(51) Int. Cl.
*F25D 23/06* (2006.01)
*A47B 67/02* (2006.01)

(52) U.S. Cl.
CPC ............ *F25D 23/063* (2013.01); *A47B 67/02* (2013.01); *A47B 2067/025* (2013.01)

(58) Field of Classification Search
CPC .... A61B 50/13; A61G 12/001; A61G 12/008; A47B 2067/025; A47B 67/02; F25D 23/063
See application file for complete search history.

(56) References Cited

U.S. PATENT DOCUMENTS

| | | | |
|---|---|---|---|
| 6,294,999 B1 * | 9/2001 | Yarin | G16H 20/13 705/2 |
| 10,679,181 B1 | 6/2020 | Prater et al. | |
| 11,017,350 B1 | 5/2021 | De Bonet et al. | |
| 2013/0332271 A1 * | 12/2013 | Hay | G06Q 20/208 705/16 |
| 2015/0005934 A1 * | 1/2015 | Bell | A61J 7/0069 700/242 |
| 2015/0223891 A1 * | 8/2015 | Miller | A61B 5/1171 726/19 |
| 2016/0026032 A1 | 1/2016 | Moore | |

(Continued)

FOREIGN PATENT DOCUMENTS

| | | | | |
|---|---|---|---|---|
| CN | 211013201 U | | 7/2020 | |
| CN | 112754183 A | * | 5/2021 | ............. A47B 67/02 |

(Continued)

OTHER PUBLICATIONS

Wihey, "Smart shelf-management system for retail", http://www.wiihey.com/en/applications/smart-shelf-management-system.html, 6 pages, 2016.

(Continued)

*Primary Examiner* — Matthew W Ing
(74) *Attorney, Agent, or Firm* — Fox Rothschild LLP

(57) ABSTRACT

Systems and methods related to medical cabinets and medical cabinet systems are provided. In particular, they include structure and systems that incorporate or expand medical cabinet systems with platform-based (open access) devices that can assist with managing and stocking of medical products in controlled environments (e.g., rooms having restricted access such locks or key codes to allow authorized personnel). They also include providing convenient expansion to temperature regulated products by adapting refrigerators or freezers using specialized shelf top platform devices that operate inside the refrigerator or freezer by way of the integration of algorithms and/or hardware.

19 Claims, 9 Drawing Sheets

(56) References Cited

U.S. PATENT DOCUMENTS

| | | | |
|---|---|---|---|
| 2016/0048798 | A1 | 2/2016 | Meyer et al. |
| 2016/0253735 | A1 | 9/2016 | Scudillo et al. |
| 2017/0148005 | A1* | 5/2017 | Murn ................ G06Q 30/0226 |
| 2018/0016528 | A9 | 1/2018 | Steele et al. |
| 2018/0365642 | A1 | 12/2018 | Bonner et al. |
| 2019/0108474 | A1 | 4/2019 | Tripathi |
| 2019/0272498 | A1 | 9/2019 | Swafford |
| 2020/0013002 | A1 | 1/2020 | Hayashi et al. |
| 2020/0219371 | A1 | 7/2020 | Mizuno |
| 2020/0222261 | A1* | 7/2020 | Ito ..................... G06K 19/0728 |
| 2020/0253193 | A1 | 8/2020 | Bryant et al. |
| 2020/0278238 | A1 | 9/2020 | Lane et al. |
| 2020/0383499 | A1 | 12/2020 | Ting et al. |
| 2020/0410446 | A1 | 12/2020 | Rahilly et al. |
| 2021/0042730 | A1 | 2/2021 | Lee |
| 2021/0073723 | A1 | 3/2021 | Shakkour et al. |
| 2021/0103881 | A1 | 4/2021 | Neubarth et al. |
| 2021/0131857 | A1 | 5/2021 | Trakhimovich |
| 2021/0304122 | A1* | 9/2021 | Dattamajumdar ... G06Q 10/087 |
| 2022/0031244 | A1* | 2/2022 | Windmiller ........ A61B 5/14865 |
| 2022/0255637 | A1* | 8/2022 | Zoss ................... H04B 13/005 |

FOREIGN PATENT DOCUMENTS

| | | |
|---|---|---|
| KR | 101890142 B1 | 8/2018 |
| WO | 2020-206154 A1 | 10/2020 |

OTHER PUBLICATIONS

Amazon, "Dash Smart Shelf is Now Available", https://business.amazon.com/en/discover-more/blog/introducing-dash- smart-shelf, 5 pages, Oct. 29, 2020.

Stockvue, "Inventory That Counts Itself!", https://www.stockvue.net/.

Mettler Toledo, "Smartshelf Weighing Pad", https://www.mt.com/in/en/home/products/Industrial_Weighing_Solutions/bench-scales/smart-shelf.html.

Joerg Koesters, "Smart Shelves Will Help Stock Supermarkets Of The Future", https://www.digitalistmag.com/iot/2018/02/28/smart-shelves-will-help-stock-supermarkets-of-future-05922036/ , Feb. 28, 2018.

Adria Security Summit, "Smart Inventory Management Helps Retail in Operations, Reduce Shrinkage", https://www.adriasecuritysummit.com/smart-inventory-management-helps-retail-in-operations-reduce-shrink-prove/ , 11 pages, May 22.

The Verge, "Amazon's Dash Smart Shelf can Automatically order new office supplies when they run out", https://www.theverge.com/circuitbreaker/2019/11/21/20974790/amazon-dash-smart-shelf-order-office-supplies-automatically-small-businesses , 3 pages, Nov. 21, 2019.

\* cited by examiner

PORTABLE PLATFORM BASED PRODUCT STORAGE AND EXPANSION SYSTEMS, DEVICES AND METHOD

FIELD OF THE INVENTION

Embodiments of the present invention are related to innovative techniques that assist in controlled product dispensing and on-demand access preferably for regulated items that require precautions against misuse.

BACKGROUND OF THE INVENTION

In the field of medical facilities and treatment facilities, there is a general need and various methods for providing in-person caregivers such as nurses physical access to regulated medical devices or medical treatments such as packaged pharmaceuticals. There are many solutions that address and assist with this type of service based on differing approaches or primary approaches such as being configured more towards security, ease of access, physical convenience, mobility, etc. Regulated items may often times contain products that are harmful if mistakenly given to the wrong patient or can have consequences if stolen or misused. The items themselves can be under significant federal regulations directed to for example to controlling general public access. There are many factors that can be identified or evaluated but based on applicant's review, existing solutions are deficient or do not meet the expected desired needs of operators of these types of facilities. Other applications or fields may also benefit from the improvements contemplated herein.

SUMMARY OF THE INVENTION

In accordance with principles of the invention, systems, methods, cabinets, processes, and computer readable medium providing advances in medical cabinet technology are provided. For example, in one or more embodiments, a medical cabinet system that stores packaged medicine or other regulated healthcare related devices for stocking or dispensing using an optical scanner is provided.

The system can comprise: an optical scanner that is configured to scan products, a cabinet adapted to be positioned in a room to allow for walk-up access by users.

The cabinet comprising: a frame that supports the structure and contains a plurality of drawers, the plurality of drawers being adapted in the cabinet to secure products from open removal from the cabinet unless unlocked by the system, a display monitor a computer that is configured to lock the plurality of drawers and unlock one or more drawers in a response to a user providing one or more credentials to authenticate the user on the medical cabinet system; a camera that is configured to record a view of the activity in the room.

The medical cabinet system is configured to store serial numbers for individual items stored in the drawers by loading the serial number when the item is scanned using an optical scanner and inserted in the drawer; wherein the cabinet maintains the status of the items using the serial numbers when authorized users take items from the cabinet. The system further includes a plurality of portable open-top inventory trays, wherein the mobile trays are adapted to be placed on a table top or shelf and each tray is adapted to have a planar top surface adapted to receive packaged medicine or other regulated healthcare related device for stocking or dispensing, wherein the trays are configured to be positioned proximately near the cabinet in the room, each tray is adapted to include a scale that determines the weight of the items placed on the tray, wherein the trays are configured to detect a change in the weight of the items on the scale.

The cabinet system is configured to allow users to login to the system while in view of the cabinet to authenticate the user and record video of users that interact with the trays; the system is configured to update the serial number of the item taken from the tray, and whereby trays provide an expansion of the secure cabinet by providing one or more trays that provide open access to items from the top side of the tray.

The medical cabinet system can include a cabinet comprising drawers adapted to provide plural temperature zones and the tray is adapted to operate in a refrigerator or freezer.

In some embodiments, one or more trays are adapted to be powered by a power outlet.

In some embodiments, the cabinet and the trays are adapted to cooperatively operate using wireless communications.

In some embodiments, the cabinet is configured to activate the camera to record a current user including the current user's actions away from the cabinet when the current user is removing an item from a tray.

In some embodiments, the tray is configured to include an activation switch on the front panel of the tray. The system can be configured to track the items removed from the drawers and trays using the serial number of the item based on an optical scan by the scanner. The top planar surface is adapted to receive a removable bin.

In some embodiments, the tray is configured to include an enclosure that contains a processer, memory, and wireless communication circuit adapted to operate the tray and communicate with the cabinet or a network server.

In one or more embodiments, a medical storage and dispensing system for packaged medicine and regulated medical products is provided using an optical scanner and comprising trays for flexible operating environments and enclosed spaces. The system may include an integrated portable open-top tray comprising an enclosed housing and a platform positioned above housing, wherein the platform includes a solid flat surface that is adapted to receive and support a plurality of packaged medicine or regulated medical products, the tray further comprising, enclosed within the housing, a processor, memory, battery and wireless communications circuit that are configured to operate the tray when the tray is put in use in the system, the tray further comprising a weight sensor, a temperature sensor, a motion sensor and a light sensor that are supported and housed by housing, wherein the processor, memory, communication circuit, temperature sensor, motion sensor and light sensor are adapted to operate under normal conditions operating in a refrigerator or freezer; wherein the weight sensor is configured to sense the weight of a total load on the platform and the platform is supported or carried by the housing.

In one or more embodiments, computer readable instructions are stored in the non-transient memory configured the process and wireless communication circuit to perform steps comprising: implement a timer that switches the tray to a sleep mode in which the tray is operating in a low power mode in which electrical power is applied to provide limited functionality until one or more types of activity is detected; control when communications are transmitted by being configured to send communications when the light sensor is activated due to the light sensor sensing light activation; in response to the light sensor being activated after being in sleep mode, transmit to the other device an update, wherein the update comprises a report of battery status, current temperature using the temperature sensor, current weight on the platform using the weight sensor to the other device; wherein the temperature, battery status and weight is received from memory and/or from the sensors, and communicate with another nearby device via wireless communications including communicating a change in the scanned items stocked on the platform based on the changes in the weight sensed by the weight sensor; and during the sleep mode, maintains the time and measures time since last update was transmitted.

If desired, the system is configured such that the tray is adapted to be without a power switch on one of four side panels of the housing.

Preferably, the housing and platform are configured to include six walls that prevent access to the process, memory, and wireless communication circuit.

In preferred embodiments, the tray is adapted to operate in each of a refrigerator, freezer, and open shelf or desktop.

The system may be configured to include a medical cabinet comprising sliding drawers and is adapted to communicate with the tray and receives the updates.

The system may be configured to communicate with a nearby computer station that is configured to authenticate users and communicate information about items in stock.

The system may further comprise a tray management device or cabinet that is positioned in close proximity to the tray and is configured to authenticate and provide inventory management of items stocked on the tray, and to verify inventory removal by the user based on the weight transmitted by the tray in response to the user scanning one or more items for removal.

The system further comprise a camera and computer station, wherein the camera is positioned distanced apart from the tray and the systems is configured to record a view of the user accessing an enclosed space to remove one or more items from the tray.

The tray in some embodiments is configured to read and store a log of temperature measurement from the temperature sensor and determine when a temperature is outside a predetermined range.

Counterpart method and computer-readable medium embodiments would be understood from the above and the overall disclosure. Also, broader, narrower, or different combinations of the described features are contemplated, such that, for example, features can be removed or added in a broader or narrower way.

BRIEF DESCRIPTION OF DRAWINGS

Various features of examples in accordance with the principles described herein may be more readily understood with reference to the following detailed description taken in conjunction with the accompanying drawings and in which.

Figure 1:
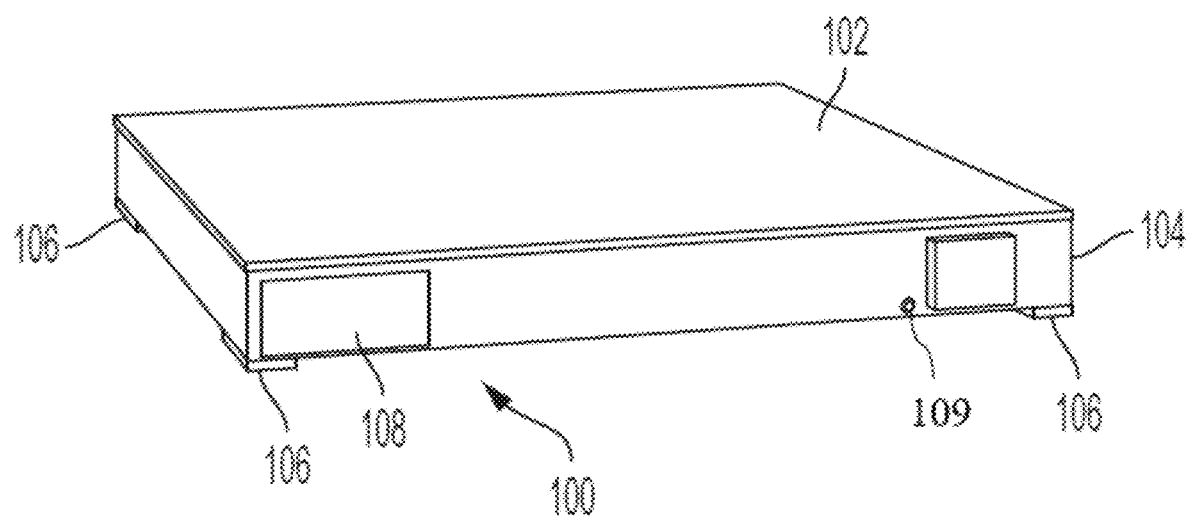
FIG. 1 depicts an illustrative tray in accordance with some embodiments of the present invention.

The components in the figures are not necessarily drawn to scale, emphasis instead being placed upon illustrating the principles of the invention. Moreover, in the figures, like reference numerals designate corresponding parts throughout the different views. However, like parts do not always have like reference numerals. Moreover, all illustrations are intended to convey concepts, where relative sizes, shapes and other detailed attributes may be illustrated schematically rather than literally or precisely. Furthermore, counterpart system, method, and computer-readable medium embodiments would be understood from the above and the overall disclosure. Also, broader, narrower, or different combinations of the described features are contemplated, such that, for example features can be removed or added in a broadening or narrowing way.

DETAILED DESCRIPTION OF THE INVENTION

In the field of medical cabinets, a significant amount of effort is directed to developing technology that accomplishes a range of objectives including security, efficiency, responsiveness, flexibility, product quality/maintenance and ease of use/operation. In some embodiments, technology described herein integrates a secure medical cabinet with quick expansion configuration by for example integrating a system of tray-based devices that are openly accessible from a top platform of each tray, while the system maintains various forms security, inventory tracking, and automated activation. In some embodiments, the technology described also permits tray-based medical product solutions with integrated communications and structural capability to be placed by user in a shelf top of a refrigerator or freezer. The technology uses a combination of algorithm and hardware that provides quick expansion and deployment such as via wireless local networks and/or communications with servers via a wide area network.

FIG. 1 illustrates a perspective view of a tray or tray device 100. Tray 100 includes legs 106 that are attached to the bottom of tray 100 to provide support for the tray 100. Tray 100 includes platform 102 that is adapted to have be a physical platform adapted to carry the weight of or support products thereon as a source of product stock. Platform 102 is adapted to provide a flat plane that is to receive and support items that are placed on tray 100. The surface of the platform 102 is preferably a solid support surface that is rigid and provides a contiguous flat surface for receiving and supporting items thereon for stocking, storage, and/or dispensing. As shown, the top surface is continuous flat to the edges without upward or downward slopes at the edges or throughout. Tray 100 is an open-top structure in that the top side of the tray is open for access by hand of user without any physical structure that block or interfere with free physical path of access by hand from the top to the top surface of the platform (regardless of whether a user is logged in or authenticated). Tray 100 may be adapted by way of a mechanical support to include a weight sensor that generates an output signal that corresponds to the weight of one or more items sitting on the platform. The surface of the platform is preferably configured to have the same level of height across the surface such as when an item is placed on the surface the underlying surface would be at the same level of the remaining surface (although in some embodiments the height of the overall platform may lower due to the weight but spots where items are places would not preferably compress). Tray 100 can include label or label area 108. Label area 108 can be configured to receive a printed label or a surface for writing an identification of the product stored on that tray 100. Tray 100 can also include an activation switch 109 on the front panel of the tray 100. As shown, tray 100 includes solid continuous side walls on the front, back and sides of the tray 100. The platform 102 and the front, back and side walls are adapted to form an enclosure within which the operational circuit and mechanical elements (if any) are positioned so as to be out of reach and sight. The enclosure provides security so as to prevent access to the internal operational aspects of the tray 100. Tray 100 can also include a bottom wall as part of the enclosure. Preferably, tray 100 is without a power switch for customer control over the power. If included, a power switch can be configured that is positioned on one of the walls that permits a user to have easy access from the wall to turn off the power to the tray 100. Tray 100 is preferably adapted to have a size and weight that is portable such that an individual can pick up and move the location of the tray to another tabletop or available shelf without difficulty. Preferably, tray 100 is adapted to operate as a wireless device meaning it does not have or require wires to connect the device to another device in order for it to be operating such as under normal conditions except with respect to a power cord in embodiments in which tray 100 is configured to connect with a power cord and power adapter (internal or external) to receive power from a wall outlet or other power source. In some embodiments, it is contemplated that it can be configured to include an internal battery such as a rechargeable battery that can be charged by a port on the tray 100 if desired, and it can communicate with other devices via wireless communications to perform its function within the inventory management and stocking system.

Figure 2:
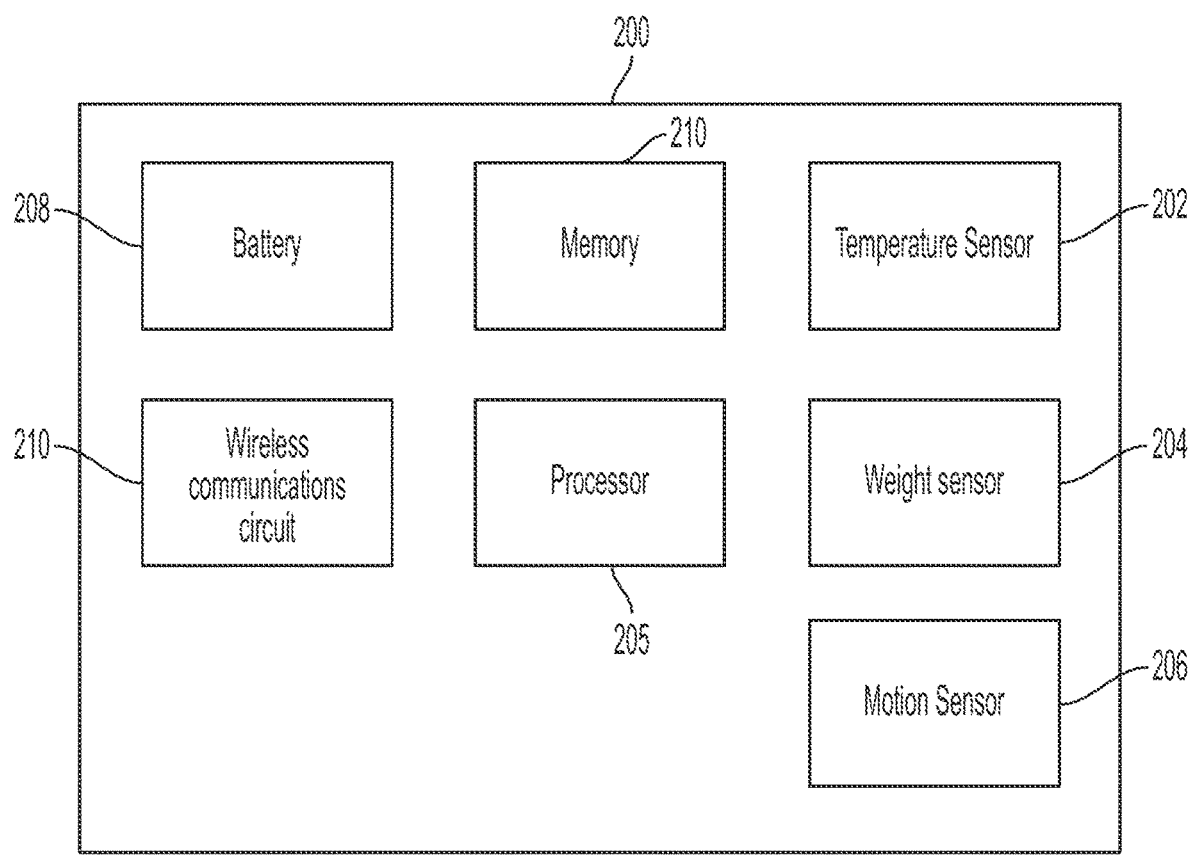
FIG. 2 depicts illustrative a functional block diagram of tray in accordance with some embodiments of the present invention.

FIG. 2 illustrates a functional block diagram of one embodiment of a tray or tray device 200 (tray device of FIG. 1). The tray 200 includes a processor 205, memory 310 configured to store computer executable instructions, such as the algorithms described herein. The tray 200 can include a temperature sensor 202 that is configured to measure the temperature in the current environment in which tray 200 is positioned for service, a weight sensor 204 that is configured to measure the weight of items placed on the tray (e.g., using a load cell), and a motion sensor 206 that is configured to sense movement near the vicinity of the tray 200. Tray 200 may include battery 208 that is configured to supply power to tray 200 to be operational (run the processer, algorithm, sensors, etc.) Tray 200 can be configured to rely only on battery power and not contain any DC or AC voltage ports that connect to external power sources. As one option for additional complexity, tray 200 can include an integrated camera or have a camera that is connected by wire or wirelessly to tray 200 but a simple tray design without a camera is preferred.

Memory 210, wireless communications circuit 210, weight sensor 204, temperature sensor 202, motion sensor 206, battery 208, can communicatively coupled to the processor 205 and can operate under the instructions of the processor 205.

The tray 200 may include wireless communication circuit 210. The wireless communication circuit 210 is configured to exchange data with an access point, a server, computer system, trays, or other connected devices via a communications network. Preferably, the wireless communication circuit 210 is configured to implement communication exchange with a nearby medical cabinet or tray management device. The wireless communication circuitry 210 is operative to interface with a communications network using a suitable communications protocol such as Wi-Fi, 802.11, Bluetooth, radio frequency systems such as 900 MHz, 1.4 GHz, and 5.6 GHz communication systems, infrared, GSM, GSM plus EDGE, CDMA, quadband, and other cellular protocols, or any other suitable protocol. Preferably, the wireless communication circuitry comprises low power and near field communications such as using Bluetooth. If desired, wireless communication circuit 210 can include an Ethernet adapter (for wired connection), a wireless network adapter, a Bluetooth adapter, or other similar types of adapters.

A tray or tray device including one or more of the components shown in FIG. 2 is contemplated.

Memory can be tangible or intangible memory which can be used to carry or store desired program codes in the form of computer-executable instructions or data structures. Tangible memory, for example, may include random access memory, read only memory, magnetic disk storage media, optical storage media, flash memory devices, and other tangible and non-transitory storage devices. Intangible memory, for example, may include storages implemented by software.

The tray may include mechanical components that for example establish the capability to use the sensor to weight items placed on the tray. Tray 200 preferably includes an enclosure that encloses the operational circuitry and electronics (e.g., processor and memory) inside the enclosure. The enclosures secures the operational circuitry and electronics from being accessible. This protects from damage and unwanted access to the circuitry and electronics. The operational circuitry and electronics such as the processor, memory, wireless communication circuit, temperature sensor, weight sensor and/or motion sensor comprises materials and/or structure that is manufactured to operate in a wide range of temperatures including demanding conditions such a long term use in a refrigerated zone or freezer zone. As such, preferably, the operational circuitry and electronics are configured to have normal operating conditions adapted to operate in temperature conditions in a refrigerator, freezer, or room temperature (meaning for an extended period without material errors or failures). Material used for the semiconductor can be configured to meet the temperature ranges. Semiconductor circuitry can be of the type that is hardened to meet temperatures demands. The temperatures range can be about −25 Celsius (C) to about 15 C including about −25c to about −15c, about −2c to about 8c, and/or about 15c to about 25c. The term about refers to a range including + or −25% that includes + or −10%.

The tray 200 can be configured as part of a system that includes an optical scanner to scan items to stock or remove items from inventory using the tray.

The tray 200 may be implemented as one single device. Each component in the tray 200 may also be a separate, independent device and the components are connected together (e.g., through wireless connection) to form the functionality. Different combinations are also contemplated such that components can be removed or added in a broadening or narrowing way.

Figure 3:
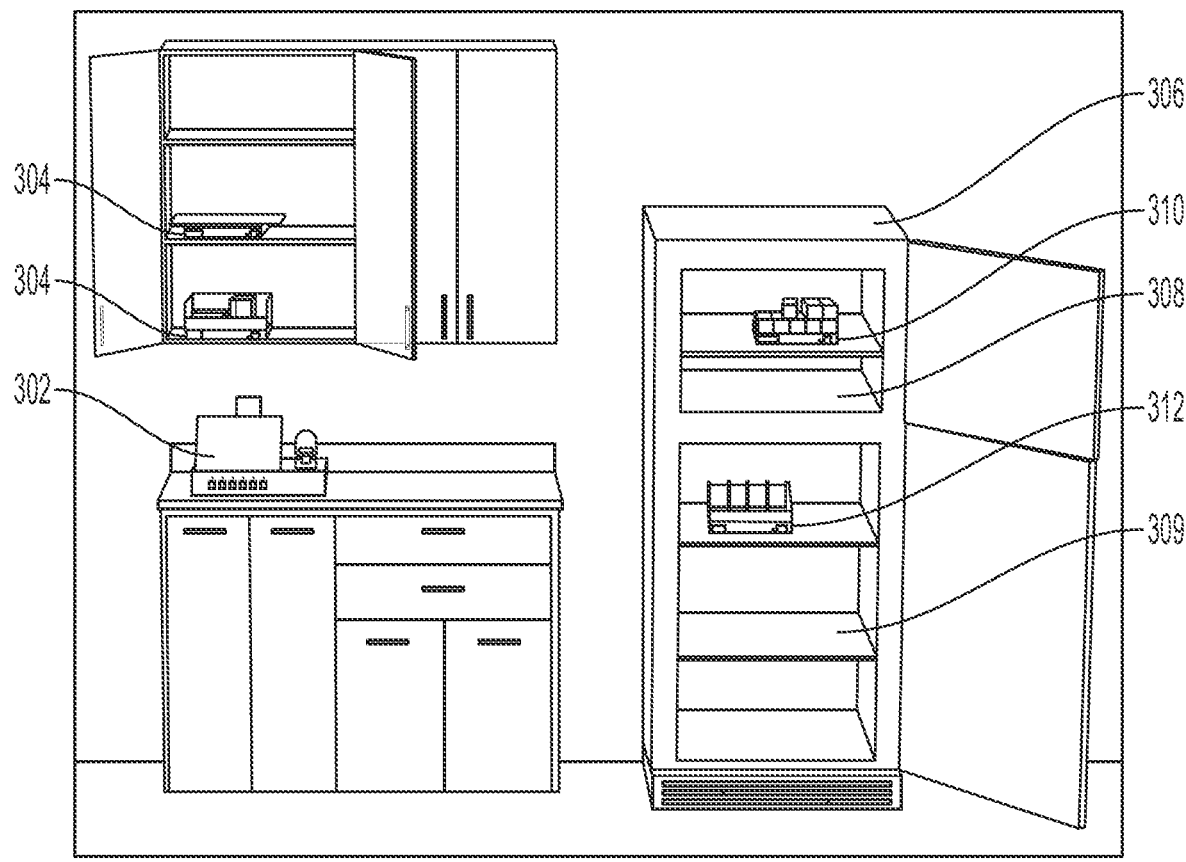
FIG. 3 depicts an illustrative in-facility or in-room implementation of a system including a tray management device and trays including trays that are part of the system and positioned for use in a refrigerate zone and freezer zone of a conventional refrigerator in accordance with some embodiments of the present invention.

FIG. 3 is a diagram of an illustrative use of trays in a medical facility such as one in which caregivers are treating patients with medical devices or packaged medical product and require access to the corresponding products. Each product can be a regulated item that requires inventory control and particular environment conditions to be maintained for an extended period for the product to be effective and/or safe for use in treatment.

Tray management device 302 can be configured to be placed on a countertop or table and plugged into a power source such as wall outlet. Tray management device can include a display monitor for interaction and include or be associated with an optical scanner. A functional block diagram of the tray management device is provided in FIG. 4. Trays 304 are placed by a user on shelves of a wall hanging cabinet that has a cabinet door that can be opened to view and access trays 304. As shown, cabinet doors are not configured with locks or security that is required to open the cabinet. A refrigerator 306 is illustrated that includes a freezer 308 and refrigerated compartment 309 that are adapted to include shelves. Refrigerator 306 can be a conventional or "off the shelf" that is being improved by the use of the trays within the refrigerator 306. Tray 310 is positioned on a shelf of freezer 308 and is adapted to operate as part of the overall system to manage and track inventory placed on top of that tray. Tray 310 is configured to operate in different environmental conditions as part of the system. Tray 312 is positioned on a shelf of refrigerated compartment 309 and is adapted to operate as part of the overall system to manage and track inventory placed on top of that tray. Each of trays 304, 310, and 312 can be configured or implemented the same and can thus be moved from the room in the cabinet to freezer or refrigerator and continue to operate successfully as part of the system. Trays 304, 310, and 312 are configured to communicate wirelessly with tray management device 302 using a wireless communications protocol. Preferably, the trays and tray management device are positioned within a distance that is less than the wireless communications capabilities of their support wireless communication circuit and antenna. Preferably, they are located within the same room or within 0-20 feet of each of other without significant signal obstruction and others less based on the type and level of obstructions. Tray management device 302 can include one or more integrated cameras that are adapted to record the surrounding area so as to record individuals that take items from the trays 304, 310, or 312. Separate cameras that for example communicate with the tray management device 302 can be implemented with or without the integrated camera to perform the recording function. Refrigerator 306 or similar enclosure includes doors that are closed to maintain the temperature of the compartment and the doors can be without locks or security to allow open access. The wireless capability of trays 304, 310, and 312 can be such that it is not adapted to communicate through the material and structure of refrigerator 306 or similar container when the compartment closed. The trays include supplemental features as further discussed herein.

Figure 4:
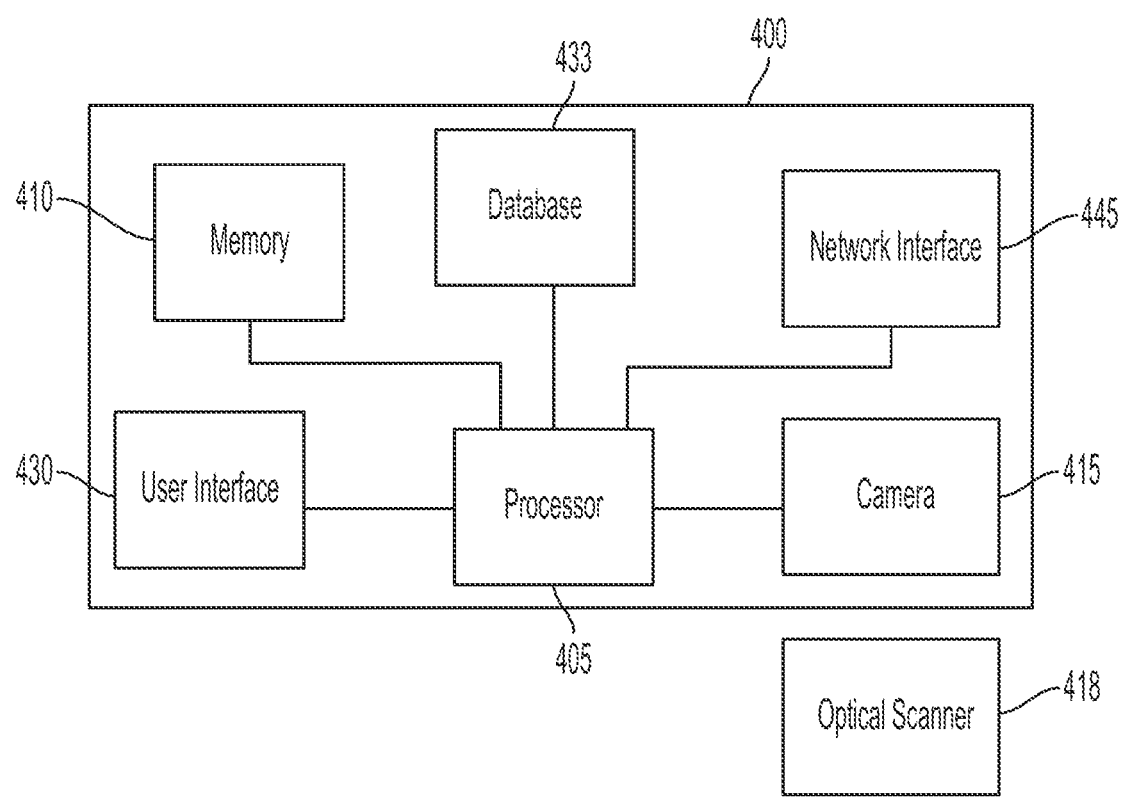
FIG. 4 depicts an illustrative functional block diagram of a tray management device in accordance with some embodiments of the present invention.

FIG. 4 illustrates a functional block diagram of one embodiment of a tray management device 400 (tray management device of FIG. 3). The device 400 includes a processor 405, memory 410 configured to store computer executable instructions, such as the algorithms described herein, a user interface 430 configured to allow users to interact with the device 400, and a database 433. Tray management device can include a camera 415 positioned and adapted to face the user and a view of the room where trays are positioned to record user interaction with the trays.

If desired, device 400 can include a camera motor configured to control the movement of the camera 415. The device 400 may include additional cameras (e.g., the total number of cameras is three or more) and associated motors or may have only one camera. Memory 410, the camera 415, and the user interface 430, are communicatively coupled to the processor 405 and operate under the instructions of the processor 405. The camera 415 can also be communicatively coupled to processor 405. The camera 415 is preferably a visible light camera that primarily uses visible light to form an image (or frame in a video). A visible light camera, for example, can be a color camera (or color video camera) or a monochrome camera (or monochrome video camera). The device may be a physical structure such as box or computer enclosure that has camera 415 mounted on or inside it. One of more of the camera can be an integrated component of a display monitor being used for the user interface. If desired, the camera can be positioned away from the box or computer enclosure and connected via a wired or wireless connection. The database 433 is configured to store tray related information such as, tray specific information (e.g., the total number of drawers assigned to that device, an identification number or code for identifying each of the trays), user authentication information, information for communicating with a server or online application (or other databases), video information (e.g., recorded videos), inventory information, product serial numbers, and other related information used and saved by the device 400 (or as part of the overall system). The information can be stored on a server and/or online application as opposed to locally or can be stored in combination.

The device 400 (or the storage device) may also include a network interface 445. The network interface 1345 is configured to exchange data with an access point, a server, one or more trays, another computer system, trays, medical cabinet systems, or storage devices via a communications network. The network interface 445 is operative to interface with a communications network using a suitable communications protocol such as Wi-Fi, 802.11, Bluetooth, radio frequency systems such as 900 MHz, 1.4 GHz, and 5.6 GHz communication systems, infrared, GSM, GSM plus EDGE, CDMA, quadband, and other cellular protocols, or any other suitable protocol. The network interface 445 can include an Ethernet adapter (for wired connection), a wireless network adapter, a Bluetooth adapter, or other similar types of adapters. The network interface 445 can be communicatively coupled to the processor 405.

A tray management device including one or more of the components shown in FIG. 4 is also contemplated.

Memory can be tangible or intangible memory which can be used to carry or store desired program codes in the form of computer-executable instructions or data structures. Tangible memory, for example, may include random access memory, read only memory, magnetic disk storage media, optical storage media, flash memory devices, and other tangible and non-transitory storage devices. Intangible memory, for example, may include storages implemented by software.

Database can also be tangible or intangible databases which can be used to carry or store storage device data, administrator and user data, or other high-level data generated as a result of executing the computer instructions in the memory (other than computer instructions themselves). Tangible database, for example, may include a hard-drive, solid state drive, flash memory, permanent memory such as ROM, magnetic, optical, semiconductor, or any other suitable type of storage component. Intangible database, for example, may include storages implemented by software.

The tray management device 400 may include mechanical components such as for raising or lowering a display monitor.

The tray management device 400 can include an optical scanner 418 that is configured with the device to scan items to stock or remove items from inventory by users physically adding or removing items from one or more trays in conjunction with the scanning.

The device 400 may be implemented as one single system. Each component in the system 400 may also be a separate, independent device and the components are connected together (e.g., through wireless connection) to form the device 400. Different combinations are also contemplated such that components can be removed or added in a broadening or narrowing way.

As shown in FIG. 4 and other Figs, the tray management device is configured to be a physical station that is not a mobile device and is configured to sit on a counter as the location for its operation (generally fixed location). In preferred embodiments, the tray management device is a computer tablet such as an iPad or Android tablet that is configured using software to perform the functionality described herein. The computer tablet can be configured to include an optical scanner to scan codes. The computer tablet is a mobile device that has a physical configuration similar to the display screen shown in the figures for the tray management device. The profile and shape of tablets are generally known to those of ordinary skill in the art. The tablet implementation includes one or more cameras that are configured to face the user and a camera facing away from the user. The user-facing camera can be used to identify and store images or recordings of the user interacting with the tablet. The tablet can be generally placed near the vicinity of the trays so that different users can pick up the tablet and login and use the system. In such configuration, the tablet would not typically be configured to record video of users interacting with a platform to remove an item. If desired, this feature can be integrated with other cameras (e.g., wirelessly) in the room to generate such recording. Images or videos can be stored locally on the device, the tablet, or sent to be stored over a wide area network or LAN in some other location for retrieval and/or review. In such implementations, there could be a separate scanner that works with the tablet but preferably the tablet provides the functionality. Except as noted, the tablet preferably has the features and functionality illustratively described in connection with FIG. 4. The tray management device as described can include a tablet (or other mobile device) implementation.

The tray management device can be incorporated into a medical cabinet or medical cabinet system.

Figure 5:
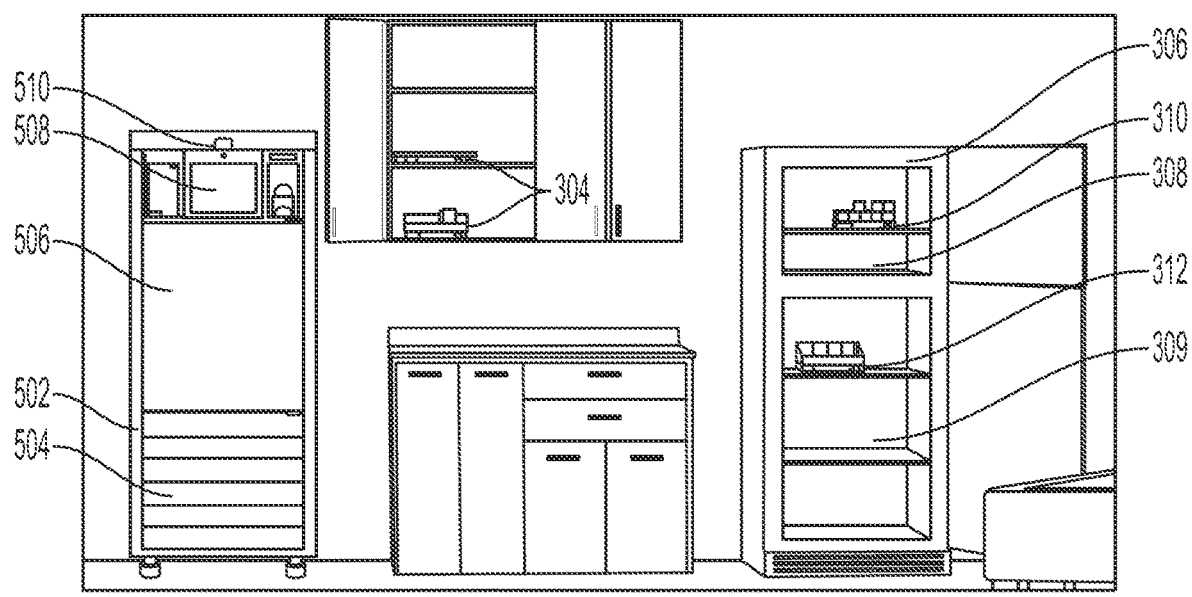
FIG. 5 depicts an illustrative in-facility or in-room implementation of a system including a medical cabinet and trays including trays that are part of the system and positioned for use in a refrigerate zone and freezer zone of a conventional refrigerator in accordance with some embodiments of the present invention.

FIG. 5 illustrates a diagram of an illustrative use of trays in a medical facility such as one in which caregivers are treating patients with medical devices or packaged medical product and require access to the corresponding products. Each product can be a regulated items by require inventory control and particular environment conditions for the product to be effective and/or safe for use in treatment. In this implementation a medical cabinet is configured to be expanded by adding trays near or in the vicinity of the medical cabinet.

For example, medical cabinet 502 can be an independent and distinct physical cabinet that is configured to physical secure products such as regulated medical devices or medical products inside the cabinet. Cabinet 502 is configured to include drawers 504 and refrigerated (and/or freezer) compartment 506 that are configured to be locked. Display screen 508 can be a touch interface that permits (with supporting software) to allow an individual that walks up to the cabinet to be authenticated and in response one or more drawers or compartments are unlocked. Cabinet 502 can include one more camera that are configured using support circuitry to record a view of user interaction with the drawer or compartment. For example, camera 510 can be pointing down to record the hand movement or activity when the user is authenticated, and a drawer is opened. One or more other cameras such as in the same location as 510 or other locations on the cabinet or in the same room can be configured if desired to record activity in the room such as in connection with nearby trays. Cabinet 502 can be configured to provide the same functionality as the tray management device in connection with the trays. For example, the trays can be placed near cabinet 502 to work with (paired with and operatively join) the cabinet without requiring a separate tray management device. If desired, a cabinet and tray management device can cooperatively work with the trays in the same room for example. Trays 304 are placed by a user on shelves of a wall hanging cabinet that has a cabinet door that can be opened to view and access trays 304. As shown, cabinet doors are not configured with locks or security that is required to open the cabinet. A refrigerator 306 is illustrated that includes a freezer 308 and refrigerated compartment 309 that are adapted to include shelves. Refrigerator 306 can be a conventional or "off the shelf" that is being improved by the use of the trays within the refrigerator 306. Tray 310 is positioned on a shelf of freezer 308 and is adapted to operate as part of the overall system to manage and track inventory placed on top of that tray. Tray 310 is configured to operate in different environmental conditions as part of the system. Tray 312 is positioned on a shelf of refrigerated compartment 309 and is adapted to operate as part of the overall system to manage and track inventory placed on top of that tray. Each of trays 304, 310, and 312 can be configured or implemented the same and can thus be moved from the room in the cabinet to freezer or refrigerator and continue to operate successfully as part of the system. Trays 304, 310, and 312 are configured to communicate wirelessly with cabinet 502 using a wireless communications protocol. Preferably, the trays and cabinet 502 are positioned within a distance that is less than the wireless communications capabilities of their support circuit and antenna. Preferably, they are located within the same room or within 0-20 feet of each of other without obstructions and otherwise less based on the type and level of obstructions. Refrigerator 306 or similar enclosure includes doors that are closed to maintain the temperature of the compartment and the doors can be without locks or security to allow open access. The wireless capability of trays 304, 310, and 312 can be such that it is not adapted to communicate through the material and structure of refrigerator 306 or similar container when the compartment closed. In other words, the enclosures will effectively block or cause significant interference with wireless communications with the cabinet (or tray management device). This is typically because the container is made of metal. The trays includes supplemental features as further discussed herein.

Figure 6:
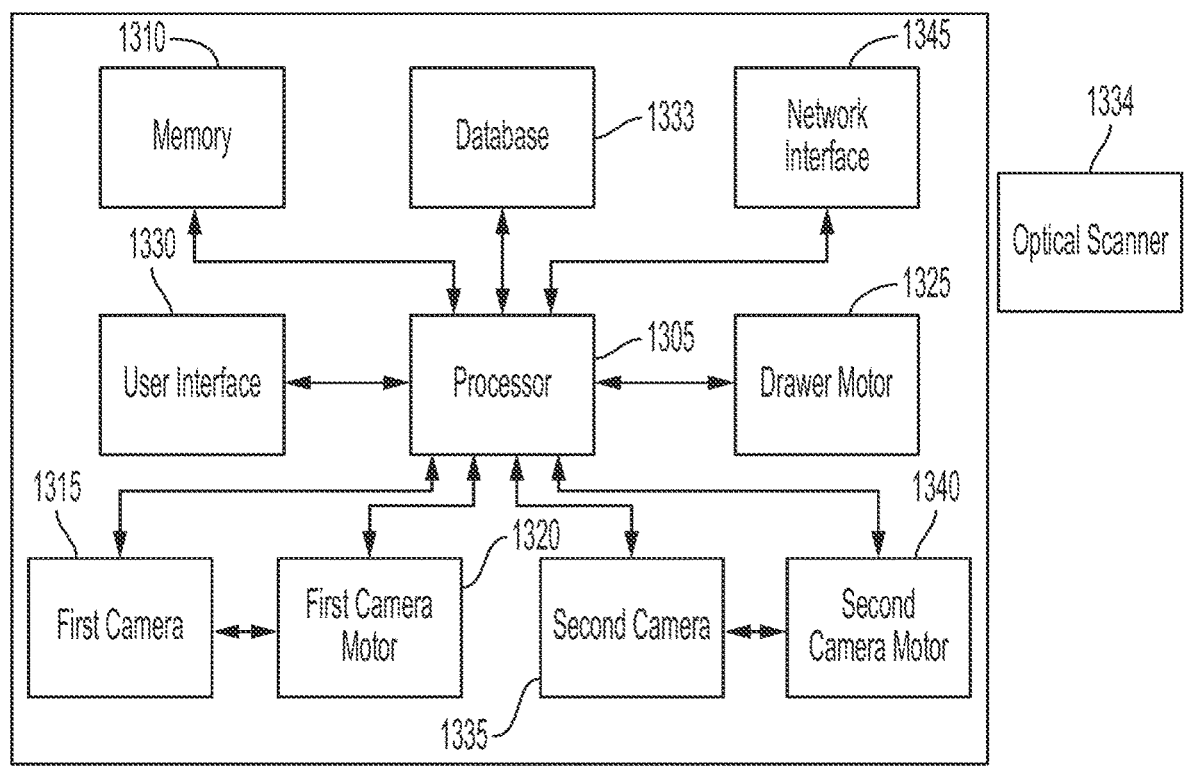
FIG. 6 depicts illustrative an illustrative functional block diagram of medical cabinet in accordance with some embodiments of the present invention.

FIG. 6 illustrates a functional block diagram of one embodiment of a medical cabinet system 1300 (embodiment of the medical cabinets discussed herein). The system 1300 includes a processor 1305, memory 1310 configured to store computer executable instructions, such as the algorithms described herein, a first camera 1315, a second camera 1335, a user interface 1330 configured to allow users interacting with the system 1300 or the storage device, and a database 1333. First camera 1315 can be positioned and adapted to face the user and a view of the room. Second camera 1335 can be configured to be position and adapted to view the drawers when the are opened and record user interaction with the drawer in accessing the items.

If desired, system 1300 can include a camera motor 1320 configured to control the movement of the first camera 1315, a drawer motor 1325 configured to control one or more drawers in the storage device, and a second camera motor 1340 configured to control the movement of the second camera 1335. The system 1300 may include additional cameras (e.g., the total number of cameras is three or more) and associated motors, or may have only one camera. Motors may be optional. Memory 1310, the first camera 1315, the camera motor 1320, the drawer motor 1325, the user interface 1330, the second camera 1335, and the second camera motor 1340 are communicatively coupled to the processor 1305 and operate under the instructions of the processor 1305. The first camera 1315 (or camera 1335) and the first camera motor 1320 (or camera motor 1340) can also be communicatively coupled. The first camera 1315 and second camera 1335 are preferably a visible light camera that primarily uses visible light to form an image (or frame in a video). A visible light camera, for example, can be a color camera (or color video camera) or a monochrome camera (or monochrome video camera). The storage device may be a cabinet that has the first and second cameras 1313, 1335 mounted on it. One of more of the camera can be integrated component of a display monitor being used for the user interface. The database 1333 is configured to store drawer configuration information (e.g., divider configurations), drawer information (e.g., the total number of drawers in the storage device, an identification number or code for identifying each of the drawers, and the associated divider configuration, imaging information (e.g., recorded images or nest patterns), video information (e.g., recorded videos), nest identifiers, size tables, inventory information, product serial numbers, and other related information used and saved by the system 1300.

The system 1300 (or the storage device) may also include a network interface 1345. The network interface 1345 is configured to exchange data with an access point, a server, another computer system, trays, or other connected storage devices via a communications network. The network interface 1345 is operative to interface with a communications network using a suitable communications protocol such as Wi-Fi, 802.11, Bluetooth, radio frequency systems such as 900 MHz, 1.4 GHz, and 5.6 GHz communication systems, infrared, GSM, GSM plus EDGE, CDMA, quadband, and other cellular protocols, or any other suitable protocol. The network interface 130 can include an Ethernet adapter (for wired connection), a wireless network adapter, a Bluetooth adapter, or other similar types of adapters.

A medical cabinet system including one or more of the components shown in FIG. 13 is also contemplated. The terms medical cabinet and medical cabinet system are sometimes used interchangeably, both of which include at least a physical medical cabinet with the described drawers and supporting on-location functionality.

Memory can be tangible or intangible memory which can be used to carry or store desired program codes in the form of computer-executable instructions or data structures. Tangible memory, for example, may include random access memory, read only memory, magnetic disk storage media, optical storage media, flash memory devices, and other tangible and non-transitory storage devices. Intangible memory, for example, may include storages implemented by software.

Database can also be tangible or intangible databases which can be used to carry or store storage device data, administrator and user data, or other high level data generated as a result of executing the computer instructions in the memory (other than computer instructions themselves). Tangible database, for example, may include a hard-drive, solid state drive, flash memory, permanent memory such as ROM, magnetic, optical, semiconductor, or any other suitable type of storage component. Intangible database, for example, may include storages implemented by software.

If desired, the storage device may include mechanical components (e.g., sliding mechanisms) controlled by the drawer motor 1325 to open and close the drawers.

The medical cabinet system 1300 can include an optical scanner 1334 that is configured with the device to scan items to stock or remove items from inventory by users.

The medical cabinet system 1300 may be implemented as one single system. Each component in the system 1300 may also be a separate, independent device and the components are connected together (e.g., through wireless connection) to form the system 1300. Different combinations are also contemplated such that components can be removed or added in a broadening or narrowing way.

Figure 7:
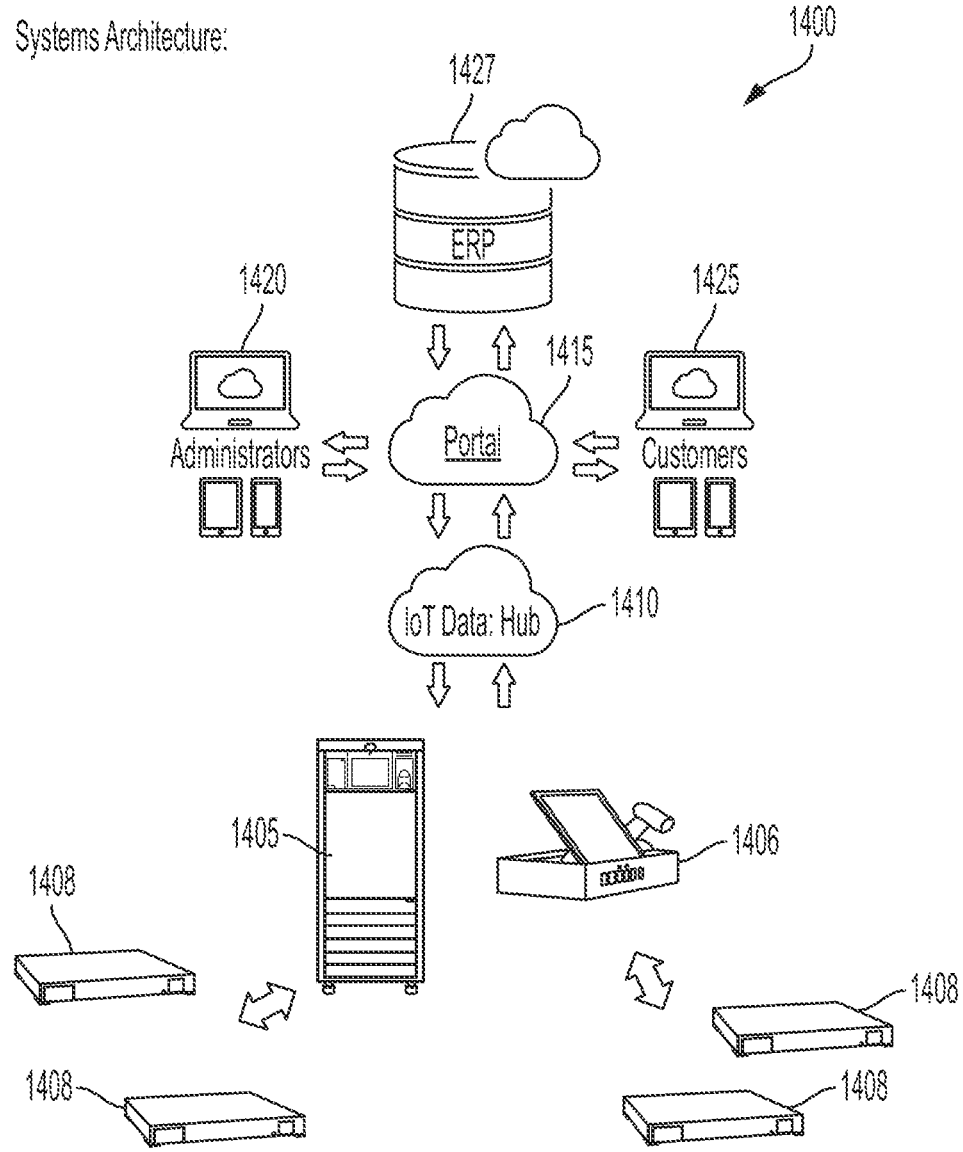
FIG. 7 depicts an illustrative system in accordance with some embodiments of the present invention.

FIG. 7 depicts an illustrative system architecture. The system 1400 includes one or more storage devices 1405, a computer hub 1410, a server 1415 implementing a portal, an administrator client device 1420, a customer client device 1425, tray management device 1406, trays 1408, and a management computer system 1427. The medical cabinet system in the storage device 1405 and the tray management system in trays 1408 are configured to communicate (e.g., receive and transmit data) with the server 1415 via the computer hub 1410. The computer hub 1410 is configured to receive data and transmit data via a communications protocol. The computer hub 1410 is also configured to manage connectivity and data traffic between the server 1415 and the storage devices 1405. The computer hub 1410, for example, can be an IoT data hub. An IoT data hub can be an application implemented on a computing cloud service over the Internet that is configured to handle communications with the storage devices 1405. An IoT data hub can also be a system that is implemented at the same location as where the storage devices 1405 are located or at a remote location. The system is configured to communicate with the storage devices 1405 and/or tray management device(s) 1406 via a private network such as WiFi, LAN, etc. The storage devices 1405 and tray management device 1406 are equipped with devices that are configured to communicate with the system. The IoT data hub may be configured to receive and aggregate data from the storage devices 1405 and/or tray management devices 1406 periodically over the Internet or intranet such as every 5 minutes or at other frequencies. Storage devices 1405 may be connected via WiFi or LAN to other storage devices or may stand alone independently.

Tray management devices 1406 may be connected via WiFi or LAN to other tray management devices or may stand alone independently. If desired, in some embodiments, as potential different configuration, a cabinet can connect to a physically separate tray management device and manage the trays through the tray management device. The server 1415 that implements a portal is where all the data resides for managing the connected storage devices 1405 and tray management devices 1406. The server 1415 can be implemented on a cloud computing service over the Internet or on a system over a private network. The server 1415 may connect to a management computer system 1427 to facilitate movement of inventory through an integrated supply chain. The management computer system 1427, for example, may be an Enterprise Resource Planning (ERP) system. The server 1415 serves as the system of record for connected storage devices 1405 and/or tray management devices 1406 with regard to customer usage and demand, restocking, alert and trouble managed and storage device life cycle events. Administrators are individuals who are employed by the company deploying the storage devices 1405. Administrators access the server 1415 from their administrator client devices 1420 to access information regarding specific storage devices and interact with the storage devices 1405 and customers through various machine command protocols. For example, administrators can monitor the inventory of the storage devices, submit orders for items that are low on supplies or have no supplies, and issue invoices for the orders to the respective customers.

Administrators can also monitor the operating status of the storage devices, tray management devices, and/or trays and check if any storage devices, tray management devices and/or trays require adjustment, maintenance, or repair. For instance, administrators can observe that some storage devices have been set to operate at a higher than the maximum allowed temperature and inform the respective customers to lower their storage temperature. Administrators can note that some storage devices are operating in an alternative mode that relies on a backup battery, instead of the normal operating mode that relies on the primary source of power. Customers are individuals or entities that bought, leased, or otherwise have access to the storage device 1405, tray management device, or tray through a relationship with the company of the administrators. Customers likewise have access to reporting and other interactions with the server 1415 via their customer client devices 1425. Customers can also monitor the operating status of the storage devices, tray management devices, and/or trays and can place orders with human intervention or have orders placed automatically based on usage. After the customer receives the items, the storage device can tell the customer where in the storage device or which tray the items should be placed. For example, the storage device may instruct the customer to enter the order number from the user interface and the storage device may show the drawers and nests (or tray) where the items should belong on the user interface. Or for example, the tray management device may instruct the customer to enter the order number from the user interface and the tray management device may inform the user which tray the items should belong or are stocked. If desired, the storage device may also automatically eject the involved drawers. Administrators and customers can control and interact with the storage devices or tray management devices from their respective client devices that are remote from the location of the storage devices or over a network or Internet. Administrators and customers can create their respective accounts (e.g., username and password) in order to access the portal. A client device may be a desktop computer, laptop computer, a mobile computer, a tablet computer, a cellular device, a smartphone, a personal digital assistant (PDA), or any other computing devices having a microprocessor and memory.

Figure 8:
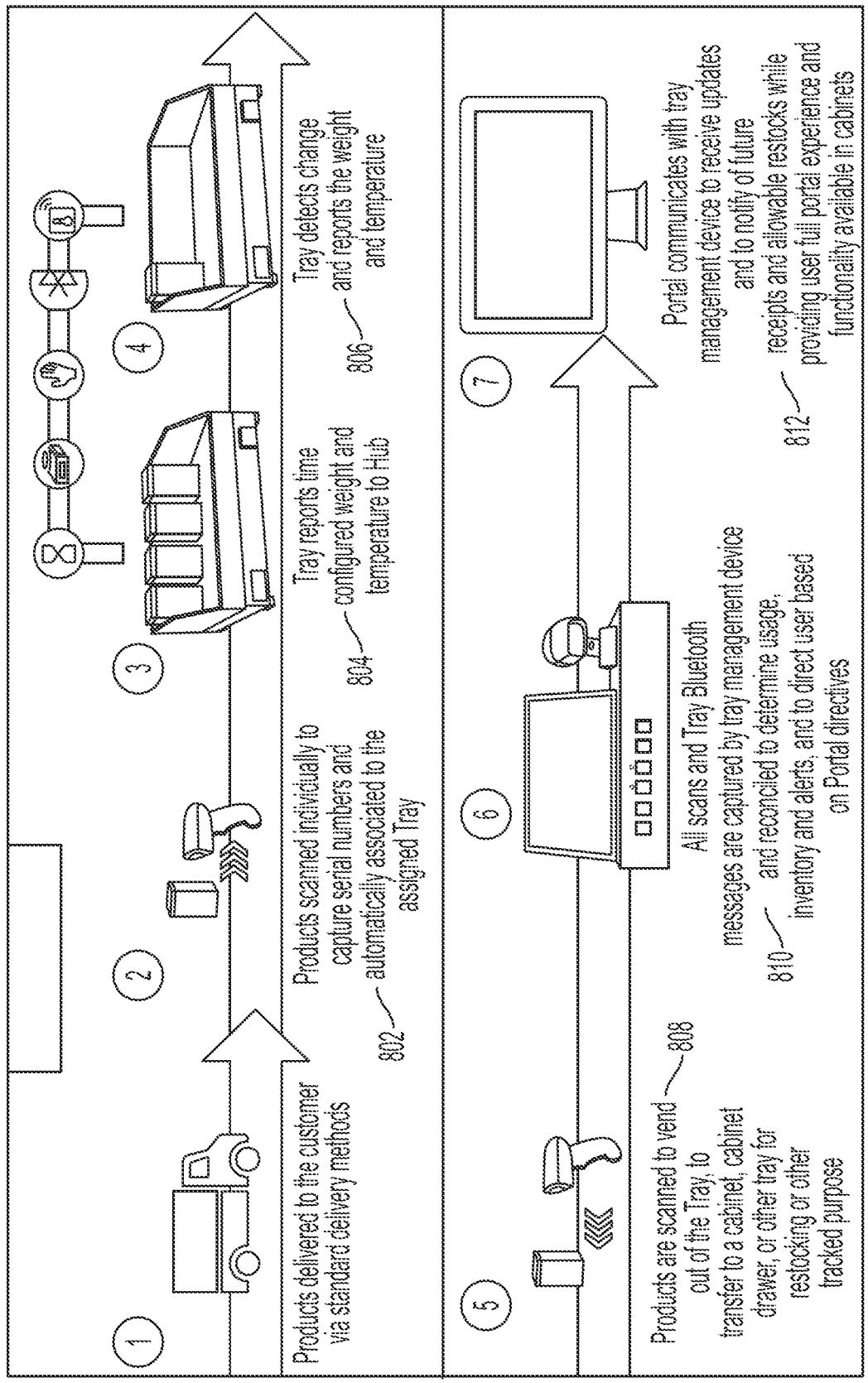
FIG. 8 depicts an illustrative method related to some aspects of system or tray operation in accordance with some embodiments of the present invention.

FIG. 8 illustrates a process and related system or device configurations. Product can be delivered to customers based on various triggers such as an order or regular delivery. At step 802, products delivered to the customer (and tracked in the providers systems) can be scanned using an optical scanner. The products can have individual product/item serial numbers configured to track a product at the individual item level. The serial numbers are stored in a database such as database 1427 in FIG. 7. The products can be various items such as prepackaged medication (an individual package or bulk package) or devices such as syringes. The serial number and potentially other information is tracked by the system to maintain the tight control or tracking over the custody and distribution of the product. System 1400 (FIG. 7) can be configured with information about trays that are located at the customer's facility and the system can be configured to automatically assign products (and corresponding serial numbers) to specific trays at the facility. The scanned product can be automatically associated by the system (e.g., using the tray management device and/or cloud application) to an assigned tray at the facility.

The scanned product is placed on the assigned tray (from plural trays at the facility or room). The tray can use a weight sensor to sense the placement of the product or multiple assigned products on the sensor and send a message that communicates the change (e.g., in weight) and/or indicate the number of products on the platform. The system (which can include a combination of elements in FIG. 7) can be configured to use the output of the weight sensor and in combination with information about the weight of product associated with the serial number and product to confirm the number of products stocked on the platform and communicate the removal of stock when the weight changes (which can include calculations in the tray or tray management device or medical cabinet) that determine a unit change in the stocked item (or multiple units). Preferably, the system is configured to manage bulk products by permitting a customer to remove an item from a bulk pack and detect using the weight sensor a change in load on the platform and the change is determined to be a removal of unit within a bulk pack (a discrete fractional removal). The system can be configured to determine that the difference in weight or change in load based on the underlying sensor is about equivalent to the weight of an item or multiple items (e.g., less than the weight of the bulk pack) and based on that determination can maintain an accurate track of inventory stocked at the trays or facility.

At step 804, the tray can be configured to transmit a report via wireless messaging that reports the current time, configured weight and temperature to a management tray device or medical cabinet. At step 806, in response to tray sensing the removal of one or products from the tray (as shown a bin is placed over the platform) based on sensed activity such as by the weight sensor and the processing of the output sensor signal, the tray can transmit a message wirelessly to the tray management device or medical cabinet comprising the weight or output from the sensor (which includes derivatives) and current temperature.

At step 808, the system is configured to have a removed product scanned by the customer. A product that is removed and scanned from the tray can be used by the customer and the system can record in the database an update to the status of the product (e.g., by serial number). This for example can be compiled and be used to generate a list of items that were removed by the customer in a month (with details about who scanned the item based on the user logging) and can be used to generate an invoice for used items to the customer. The removal and scanning can be also be configured within the system for other modes such as to use the trays as stocking inventory for the medical cabinet or by placing the removed scanned item in a designated drawer in the medical cabinet that is for later use by the customer (e.g., take, system dispense, and use later by storing in a use later drawer in the cabinet). The designated drawer can be configured in the medial cabinet to store products (or a portion of a bulk item) that were scanned and updated in the system to be delivered to the customers (e.g., added to the monthly invoice) but is available in the drawer. The system can track the content of the designated drawer using the database and the scanner as well. The trays when implemented as a tool for supplemental inventory for stocking the medical cabinet can be positioned if desired in a secure room or closet (e.g., a stocking room).

At step 810, tray management device or medical cabinet (and supporting systems if desired) is configured to capture the product scans and use messages from the trays to reconcile the current stock of inventory and determine usage of products by the customer. The tray management device or medical cabinet can also be configured to direct customers based on control or command from the customer's portal or the cloud application in FIG. 7.

At step 812, the system is configured to provide a portal to the customer (e.g., see FIG. 7) that is configured to provide the customer with the information about the stocked items, trays, status of inventory, and delivery of products.

Figure 9:
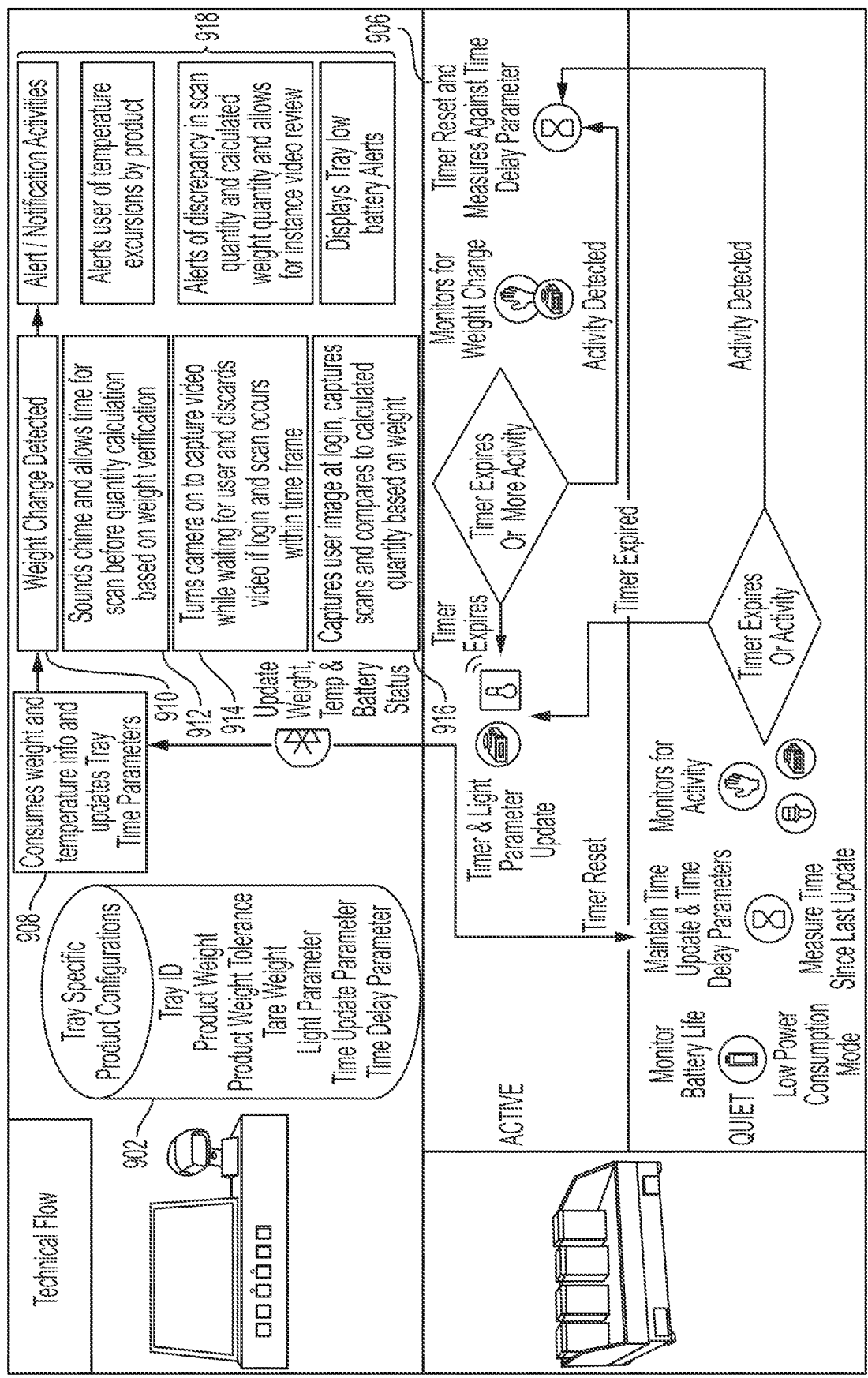
FIG. 9 depicts an illustrative method for related to some aspects of system or tray operation in accordance with some embodiments of the present invention.

FIG. 9 provides an illustrative process and functional diagram of some elements related to the operation of trays. A tray can be configured to include database 902 in the memory of the tray. Database 902 is configured to store the tray identification, the weight of the product that is assigned to that tray, the product weight tolerance, tare weight, light parameter, time update parameter, time delay parameters and potentially other data. The tray is configured to have two operational modes, active and quiet (quiet is also referred to as sleep). In the quiet mode, the tray is configured to operate in a low power consumption mode in which the tray electronics are powered off except for certain minimal elements or functionality adapted to switch the tray to an active mode when certain events or conditions occur.

Steps 904 can be implemented in the quiet mode. The tray can be configured to monitor the battery life of the tray and to operate in the lower power consumption mode. In the quiet mode, the tray can determine whether the time update parameter has been met by determining the time elapsed since the last update. The tray can maintain the time update and time delay parameter for this use. In the quiet mode, the tray can be configured to detect or sense activity by receiving an input from the motion sensor, light sensor, and/or weight sensor (e.g., someone removes an item). In response, to sensing activity, the tray is configured to proceed to step 906 and enter active mode. In the active mode, the lower power consumption process is switched off such as by the tray electronics is running without power savings. At step 906, the tray is configured to set a timer and measure against the time delay parameter and monitor using the weight sensor for change in the weight on the platform of the tray. The tray is configured to move to a next step with the timer expires unless the weight sensor senses more activity. When the temperature expires, the tray (internal electronics as described herein) is configured to update the data and/or determine, in particular, the weight of items on the tray (or change in the weight), the current temperature measurement from the temperature sensor, and current battery status. As shown, the tray is configured to perform this last operation also when the tray determine a time update parameter has been met. In response, the timer for determining when to awake from the quiet mode based on the time update parameter can be reset or updated to start again. The try is configured to conserve energy by staying in the quiet or sleep mode until sensing a removal of weight from the platform (such as above a threshold amount) and/or after a timer parameter is met so as to send an update to the supporting system (even when there has been no item removal from the tray in coincidence with switching out of quiet mode and entering active mode). The tray may switch back to quiet mode after the update message(s) is sent and can continue the same cycle. In some embodiments, the tray can be configured to be implemented inside a refrigerator as a way to retrofit the refrigerator to be an expansion unit by placing one or more trays on the shelves of the refrigerator or freezer compartment. In general, the structure of the refrigerator can interfere with wireless tray communication and do not have ports for wired connections. As described, the tray by way of implementation can be configured to switch to active mode in response to sensing using the light sensor that the light inside the refrigerator or freezer has been activated. At the point of switching to active mode, the tray can wireless transmit an update or (other pending messages) which can likely successfully communicate while the door of the refrigerator is open. if there is an item that is removed, the tray operation will reflect that make the appropriate wireless communication. The tray may use a timer to then switch back to a sleep mode as in the general operation. If desired, the light sensor can also be used to detect when the light in the container has switched off and in response switch the tray to quiet mode until further noted activity occurs.

At step 908, the tray can be configured to store the new data (e.g., temperature, weight, and/or battery reading) in the database. At step 910, the tray can determine whether a weight change is detected (more than a negligible amount—above a threshold). At step 912, the tray can be configured to play a chime in response to the determination and can be configured to allow time for the user to scan one or more products before calculating the quantity using the weight change. At step 914, the tray or other device (in communication with the tray such as the tray management device) can be configured to turn on a camera to capture video while waiting for the customer (to scan products) and if desired can discard video if the scan occurs within a time frame from the end of activity (timer expiration). Sensing the removal of weight such as an amount above threshold may trigger camera recording such as video or image capture. At step 916, the tray or other device can be configured to capture a picture of a customer when the user logs into the system (authentication process) and can store the scanned information (scanned item). Information retrieved about the scanned item(s) is used in connection with calculating the quantity removed using the weight sensor output to verify that authenticity and accuracy of the inventory removal and status. Other implementations contemplated such as the process being performed in cooperation with other devices.

At step 918, alerts or notifications are generated such as by the tray. For example, the tray can be configured to read the temperature and determine whether the temperature is within a predetermine range such as a predetermined range that is required for maintaining the regulated status of an item (to be such that it can be used in treatment). Temperature measurement that are outside of the range can trigger an alert or notification (e.g., a message that is transmitted and/or is displayed to the customer via a display). An alert is also sent when a discrepancy is determined between the scanned quantity by a current customer and calculated weight quantity (based on change in the weight). In conjunction with this, the system may have recorded video that is saved and can be used for additional review and verification. The detection of low battery can trigger an alert also.

Tray 100, medical cabinet 502, and tray management device 302 are preferably specialized devices (as opposed general purpose devices) that are adapted physically and also configured for a particular application such as that illustratively described herein. The same applies for the optical scanner. They can be implemented underlying components or circuitry in a computer, for example, as discussed below and above. Servers, desktop computers, laptops, cloud (cloud servers), mobile phone (or pads) are implemented using a computer or computer system. These devices are typically configured to be implemented to communicate via a network connection. It is possible that software features are operated or implemented to run (cooperatively) in multiple devices such as on a medical cabinet and a cloud server to provide illustrated features and functionality. A compute or computer system may also be referred to as servers in some instances. A computer or computer system includes the following features.

In operation trays are paired with a tray management device or medical cabinet that is located within a specified distance (e.g., in a room) and attach to that device to be their supporting controller or hub for operations. If desired, individual trays are configured to communicate to be dedicated to that one tray management device or medical cabinet unless an electronic communication repairing process is performed to attach it to another tray management device or medical cabinet device. In operation, the system is configured to establish network, locally, and/or over a wide area so that the above describes devices and components collaboratively operate (e.g., the cabinet, supporting sever, and trays can be part of a network that is configured to be operable by the service provider of the cabinet while the customer can communicate with the system by logging into the system using their computers).

In one embodiment, the computer system includes a bus or other communication mechanism for communicating information, and a hardware processor (processor) coupled with bus for processing information. Hardware processor may be, for example, a general-purpose microprocessor.

The computer system also includes a main memory, such as a random-access memory (RAM) or other dynamic storage device, coupled to bus for storing information and instructions to be executed by processor. Main memory also may be used for storing temporary variables or other intermediate information during execution of instructions to be executed by processor. Such instructions, when stored in non-transitory storage media accessible to processor, render computer system into a special-purpose machine that is customized to perform the operations specified in the instructions.

Computer system further includes a read only memory (ROM) or other static storage device coupled to bus for storing static information and instructions for processor. A storage device, such as a magnetic disk or optical disk, is provided and coupled to bus for storing information and instructions.

Computer system may be coupled via bus to a display, such as a cathode ray tube (CRT), for displaying information to a computer user. An input device, including alphanumeric and other keys, is coupled to bus for communicating information and command selections to processor. Another type of user input device is cursor control, such as a mouse, a trackball, or cursor direction keys for communicating direction information and command selections to processor and for controlling cursor movement on display. This input device typically has two degrees of freedom in two axes, a first axis (e.g., x) and a second axis (e.g., y), that allows the device to specify positions in a plane.

Computer system may implement the techniques described herein using customized hard-wired logic, one or more ASICs or FPGAs, firmware and/or program logic which in combination with the computer system causes or programs computer system to be a special-purpose machine. Specialized circuits such as a semiconductor specifically designed and manufactured for a custom application can be preferred in some implementations. For example, the tray may use a processor that runs specific applications or can include a specialized integrated circuit specifically designed for that application (e.g., an ASIC). According to one embodiment, the techniques herein are performed by computer system in response to processor executing one or more sequences of one or more instructions contained in main memory. Such instructions may be read into main memory from another storage medium, such as storage device. Execution of the sequences of instructions contained in main memory causes processor to perform the process steps described herein. In alternative embodiments, hard-wired circuitry may be used in place of or in combination with software instructions.

The term memory or memory media as used herein refers to any non-transitory media that store data and/or instructions that cause a machine to operation in a specific fashion. Such memory media may comprise non-volatile media and/or volatile media. Non-volatile media includes, for example, optical or magnetic disks, or other forms of memory such as solid state memory that stores information for long term storage and retrieval (e.g., memory on USB sticks). Volatile media includes dynamic memory, such as main memory. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus. Transmission media can also take the form of acoustic or light waves, such as those generated during radio-wave and infra-red data communications.

Various forms of media may be involved in carrying one or more sequences of one or more instructions to processor for execution. For example, the instructions may initially be carried on a magnetic disk or solid-state memory or drive of a computer. The remote computer can load the instructions into its dynamic memory and send the instructions over a telephone line using a modem. A modem local to computer system can receive the data on the telephone line and use an infra-red transmitter to convert the data to an infra-red signal. An infra-red detector can receive the data carried in the infra-red signal and appropriate circuitry can place the data on bus. Bus carries the data to main memory, from which processor retrieves and executes the instructions. The instructions received by main memory may optionally be stored on storage device either before or after execution by processor.

The computer system also includes a communication interface coupled to bus. Communication interface provides a two-way data communication coupling to a network link that is connected to a local network. For example, communication interface may be an integrated services digital network (ISDN) card, cable modem, satellite modem, or a modem to provide a data communication connection to a corresponding type of telephone line. As another example, communication interface may be a local area network (LAN) card to provide a data communication connection to a compatible LAN. Wireless links may also be implemented. In any such implementation, communication interface sends and receives electrical, electromagnetic or optical signals that carry digital data streams representing various types of information.

Network link typically provides data communication through one or more networks to other data devices. For instance, network link may provide a connection through local network to a host computer or to data equipment operated by an Internet Service Provider (ISP). ISP in turn provides data communication services through the worldwide packet data communication network now commonly referred to as the "Internet." Local network and Internet both use electrical, electromagnetic or optical signals that carry digital data streams. The signals through the various networks and the signals on network link and through communication interface, which carry the digital data to and from computer system, are example forms of transmission media.

Computer system can send messages and receive data, including program code, through the network(s), network link and communication interface. In the Internet example, a server might transmit a requested code for an application program through Internet, ISP, local network and communication interface.

The received code may be executed by processor as it is received, and/or stored in storage device, or other non-volatile storage for later execution.

Software can be implemented as distinct modules or software applications or can be integrated together into an overall application such as one that includes the user interface and that handles other features for providing the functionality to the user on their device.

The above-mentioned cameras can be configured or positions as physical element of the in-office medical cabinet or tray and may be configured to be positioned or adapted to record (video or image) of user's that walk up to the medical cabinet, tray management device and/or tray(s) when the user is in view of the cabinet, management device, or tray (e.g., when a camera associated with the device is configured to record a user walking up and interacting with that device or an associated device such as a tray).

The medical cabinet is preferably configured to be stationary as a fixture or appliance and may be configured to be without wheels that permit it to be used as a mobile station. The tray is preferably positioned to be stationary and has a weight that make it convenient for moving it to another location by a person by just picking it up and moving it. Preferably, the tray is not adapted to be locked, attached, or fixed to a support or a wall such that it cannot be freely removed or picked up when in use.

The system can be configured by way of the display or the management device or a device or terminal associated with the tray management device or tray to use the available database and resources to display information to the current user (logged in) that communicates information that guides the user to tray, drawer, nest and/or cabinet where the user can physically take a desired item (e.g., after information about the item of interest).

The medical cabinet and drawers can be configured to prevent or block items from open removal in contrast to the tray in which items on the trays are available to open removal. The medical cabinet drawers provide such access security by way of the drawer being closed, open nests that are available when the drawer is opened (e.g., nest do not have nest covers, but are blocked because the drawer is closed).

For the sake of brevity and clarity, the present description may have been written without specific discussion referencing software or hardware (equipment). It should be understood that software and/or hardware of the tray, cabinet or system are configured to provide the described features or functionality such as to provide the described operational capability. This is to affirmatively explain that the tray, system, cabinet, or corresponding element is configured to provide the described capability.

A computer station refers to the cabinet or tray management device as illustratively described herein.

It should be understood that variations, clarifications, or modifications are contemplated. It should also be understood by one of ordinary skill in the art that features, processes, or elements described in various context or portions in this application can be combined to provide variations (various combinations) that are within the scope. For example, in some portions, a scan or an optical reader is implemented as part of stocking and/or removing products for us but other embodiments are contemplated. It would be understood that features described herein to provide corresponding operation functionality as part of the cabinet, system, or process can be substantially, substantially only, primarily, consisting of, or consisting essentially of that feature for providing that operational functionality. Applications of the technology to other fields are likewise contemplated.

It is understood from the above description that the functionality and features of the systems, devices, or methods of embodiments of the present invention include generating and sending signals to accomplish the actions.

Exemplary systems, devices, and methods are described for illustrative purposes. Further, since numerous modifications and changes will readily be apparent to those having ordinary skill in the art, it is not desired to limit the invention to the exact constructions as demonstrated in this disclosure. Accordingly, all suitable modifications and equivalents may be resorted to falling within the scope of the invention.

Thus, for example, any sequence(s) and/or temporal order of steps of various processes or methods (or sequence of device connections or operation) that are described herein are illustrative and should not be interpreted as being restrictive. Accordingly, it should be understood that although steps of various processes or methods or connections or sequence of operations may be shown and described as being in a sequence or temporal order, but they are not necessarily limited to being carried out in any particular sequence or order. For example, the steps in such processes or methods generally may be carried out in various different sequences and orders, while still falling within the scope of the present invention. Moreover, in some discussions, it would be evident to those of ordinary skill in the art that a subsequent action, process, or feature is in response to an earlier action, process, or feature.

It is also implicit and understood that the applications or systems illustratively described herein provide computer-implemented functionality that automatically performs a process or process steps unless the description explicitly describes or would primarily be understood to involve user intervention or manual operation (e.g., determining nest configuration in a drawer is automatically performed by the cabinet, detecting a broken pattern is automatically performed by the cabinet, etc.).

It should be understood that claims that include fewer limitations, broader claims, such as claims without requiring a certain feature or process step (e.g., removing a feature or step) in the appended claim or in the specification, clarifications to the claim elements, different combinations, and alternative implementations based on the specification, or different uses, are also contemplated by the embodiments of the present invention.

The words "can" or "may" are used to communicate or clarify that this is one option and other options or variations are contemplated. This is not to say that if such a word is not used, it is being communicated that this only implementation.

It should be understood that combinations of described features or steps are contemplated even if they are not described directly together or not in the same context.

The terms or words that are used herein are directed to those of ordinary skill in the art in this field of technology and the meaning of those terms or words will be understood from terminology used in that field or can be reasonably interpreted based on the plain English meaning of the words in conjunction with knowledge in this field of technology. This includes an understanding of implicit features that for example may involve multiple possibilities, but to a person of ordinary skill in the art a reasonable or primary understanding or meaning is understood. It is intended that the specification and examples be considered as exemplary only, with a true scope being indicated by the claims and their equivalents.

What is claimed is:

1. A medical cabinet system that stores packaged medicine or other regulated healthcare related devices for stocking or dispensing using an optical scanner, comprising:
    an optical scanner that is configured to scan products;
    a cabinet adapted to be positioned in a room to allow for walk-up access by users, the cabinet comprising:
        a frame that supports the structure and contains a plurality of drawers,
        the plurality of drawers being adapted in the cabinet to secure products from open removal from the cabinet unless unlocked by the system,
        a display monitor,
        a computer that is configured to lock the plurality of drawers and unlock one or more drawers in a response to a user providing one or more credentials to authenticate the user on the medical cabinet system, and
        a camera that is configured to record a view of activity in the room,
    wherein the medical cabinet system is configured to store serial numbers for individual items stored in the drawers by loading the serial number when the item is scanned using an optical scanner and inserted in the drawers, and wherein the cabinet maintains the status of the items using the serial numbers when authorized users take items from the cabinet; and
    a plurality of portable open-top inventory trays, wherein the trays are adapted to be placed on a table top or shelf, and each of the trays comprises a planar top surface adapted to be open for access by hand of users, regardless of whether users are authenticated, to receive packaged medicine or other regulated healthcare related device for stocking or dispensing on the trays, wherein the trays are configured to be positioned in the room, wherein each of the trays comprises a weight sensor configured to detect a change in the weight of the items on the tray;
    wherein the cabinet system is configured to allow users to login to the system while in view of the cabinet to authenticate the user and record video of users that interact with the trays,
    wherein the system is configured to update the serial number of the item taken from the tray, and
    whereby the trays provide an expansion of the cabinet by providing one or more trays that provide open access to items from the top side of the tray,
    wherein when the weight sensor of the tray is activated by a weight change of the items on the tray:
        the tray switches to an active mode from a sleep mode in which operating in a lower power mode than the active mode until the weight sensor is activated,
        the cabinet activates the camera to record a user including the user's action,
        the tray communicates with another nearby device via wireless communications an update including the weight change, and
        during the sleep mode, the tray maintains the time and measures time since last update was transmitted.

2. The medical cabinet system of claim 1 wherein the cabinet comprises drawers adapted to provide plural temperature zones and the tray is adapted to operate in a refrigerator or freezer.

3. The medical cabinet system of claim 1 wherein the one or more trays are adapted to be powered by a power outlet.

4. The medical cabinet system of claim 1 wherein the cabinet and the trays are adapted to cooperatively operate using wireless communications.

5. The medical cabinet system of claim 1 wherein the tray is configured to include an activation switch on the front panel of the tray.

6. The medical cabinet system of claim 1 wherein the system is configured to track the items removed from the drawers and trays using the serial number of the item based on an optical scan by the scanner.

7. The medical cabinet system of claim 1 wherein the top planar surface is adapted to receive a removable bin.

8. The medical cabinet system of claim 1 wherein the tray is configured to include an enclosure that contains a processer, memory, and wireless communication circuit adapted to operate the tray and communicate with the cabinet or a network server.

9. A medical storage and dispensing system for packaged medicine and regulated medical products using an optical scanner and comprising trays for flexible operating environments and enclosed spaces, comprising:
    an integrated portable open-top tray comprising an enclosed housing and a platform positioned above housing, wherein the platform includes a solid flat surface that is adapted to be open for access by hand of users, regardless of whether users are authenticated, to receive and support a plurality of packaged medicine or regulated medical products on the tray, the tray further comprising, enclosed within the housing, a processor, memory, battery and wireless communications circuit that are configured to operate the tray when the tray is put in use in the system, the tray further comprising a weight sensor, a temperature sensor, a motion sensor and a light sensor that are supported and housed by housing, wherein the processor, memory, communication circuit, temperature sensor, motion sensor and light sensor are adapted to operate under normal conditions operating in a refrigerator or freezer; wherein the weight sensor is configured to sense the weight of a total load on the platform and the platform is supported or carried by the housing;

wherein computer readable instructions stored in the non-transient memory configured the process and wireless communication circuit to perform steps comprising:

implement a timer that switches the tray to a sleep mode in which the tray is operating in a low power mode in which electrical power is applied to provide limited functionality until one or more types of activity is detected;

control when communications are transmitted by being configured to send communications when the light sensor is activated due to the light sensor sensing light activation;

in response to the light sensor being activated after being in sleep mode, transmit to the other device an update, wherein the update comprises a report of battery status, current temperature using the temperature sensor, current weight on the platform using the weight sensor to the other device; wherein the temperature, battery status and weight is received from memory and/or from the sensors, and communicate with another nearby device via wireless communications including communicating a change in the scanned items stocked on the platform based on the changes in the weight sensed by the weight sensor; and during the sleep mode, maintain the time and measure time since last update was transmitted.

10. The system of claim 9 wherein the tray is adapted to be without a power switch on one of four side panels of the housing.

11. The system of claim 9 wherein the housing and platform comprising six walls that prevent access to the processor, memory, and wireless communication circuit.

12. The system of claim 9 wherein the tray is adapted to operate in each of a refrigerator, freezer, and open shelf or desktop.

13. The system of claim 9 wherein the system is configured to include a medical cabinet comprising sliding drawers and is adapted to communicate with the tray and receives the updates.

14. The system of claim 9 wherein the system is configured to communicate with a computer station that is configured to authenticate users and communicate information about items in stock.

15. The system of claim 9 where the system further comprises a computer station that is configured to authenticate and provide inventory management of items stocked on the tray, and to verify inventory removal by the user based on the weight transmitted by the tray in response to the user scanning one or more items for removal.

16. The system of claim 9 wherein the system further comprises a camera and computer station, wherein the camera is positioned distanced apart from the tray and the systems is configured to record a view of the user accessing an enclosed space to remove one or more items from the tray.

17. The system of claim 9 wherein the tray is configured to read and store a log of temperature measurement from the temperature sensor and determine when a temperature is outside a predetermined range.

18. A medical cabinet system comprising:

an optical scanner that is configured to scan products;

a cabinet adapted to be positioned in a room, the cabinet comprising:

a plurality of drawers configured to secure products from open removal from the cabinet unless unlocked by the system, a display monitor, a computer that is configured to lock the plurality of drawers and unlock one or more drawers in response to a user providing one or more credentials to authenticate the user on the medical cabinet system, and a camera that is configured to record a view of activity in the room, wherein the medical cabinet system is configured to store serial numbers for individual items stored in the drawers by loading the serial number when the item is scanned using the optical scanner and inserted in the drawers, and wherein the cabinet maintains the status of the items using the serial numbers when authorized users take items from the cabinet; and a plurality of portable open-top inventory trays positioned in the room, each of the trays comprising a planar top surface adapted to be open for access by hand of users, regardless of whether users are authenticated, to receive packaged medicine or other regulated healthcare related device for stocking or dispensing on the trays, wherein the cabinet system is configured to allow users to login to the system while in view of the cabinet to authenticate the user and record video of users that interact with the trays, wherein the system is configured to update the serial number of the item taken from the tray, whereby the trays provide an expansion of the cabinet by providing one or more trays that provide open access to items from the top side of the tray, and wherein when a sensor of the tray is activated:

the cabinet activates the camera to record a user including the user's action, the tray communicates with another nearby device via wireless communications an update including the weight change, and during a sleep mode operating in a lower power mode than an active mode until the sensor is activated, the tray maintains the time and measures time since last update was transmitted.

19. The system of claim 18, wherein when the sensor is activated, the tray switches to the active mode from the sleep mode.

* * * * *